Nov. 5, 1963 K. MILLER 3,109,552
GASTIGHT PRESSURE VESSEL
Original Filed May 29, 1961
FIG. 1
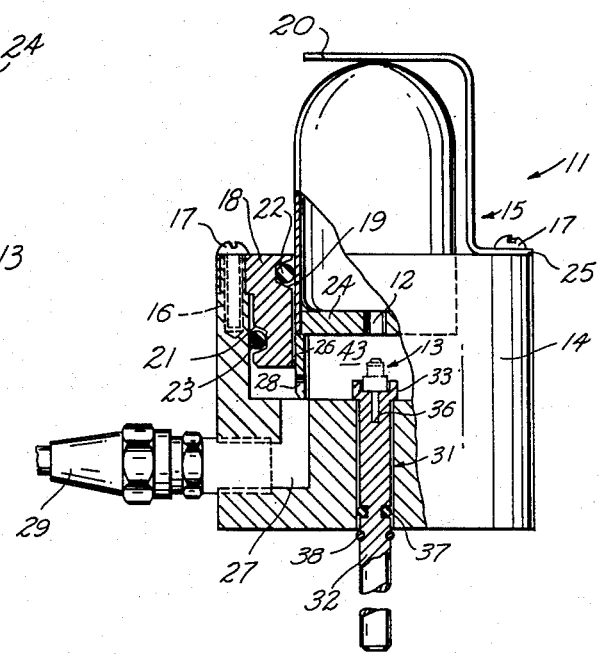
FIG. 2
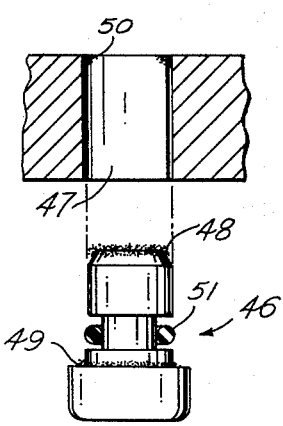
FIG. 3
FIG. 4
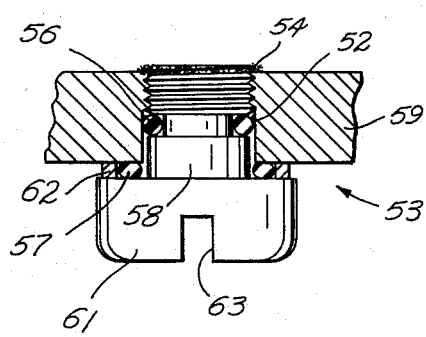
INVENTOR.
KENNETH (NMI) MILLER
BY
ATTORNEYS

United States Patent Office 3,109,552
Patented Nov. 5, 1963

3,109,552
GASTIGHT PRESSURE VESSEL
Kenneth Miller, 41 Wildwood Ave., Piedmont 10, Calif.
Original application May 29, 1961, Ser. No. 113,563, now Patent No. 3,065,583, dated Nov. 27, 1962. Divided and this application June 19, 1961, Ser. No. 118,201
2 Claims. (Cl. 220—46)
(Granted under Title 35, U.S. Code (1952), sec. 266)

The invention described herein may be manufactured and used by or for the Government of the United States of America for governmental purposes without the payment of any royalties thereon or therefor.

This application is a divisional of applicant's copending application Serial No. 113,563, filed May 29, 1961, entitled "Method for the Filling and Sealing of Pressure Vessels," issued as Patent No. 3,065,583 on November 27, 1962.

The present invention relates to gastight pressure vessels and more particularly to such pressure vessels employing a gastight, removable and replaceable plug type seal.

The generally-used method of sealing pressure vessels, such as ion chambers and the like, is by use of what is sometimes referred to as a "pigtail" seal. As related to an ion chamber, for instance, the ion chamber is exhausted and filled with an ionizing gas through a copper tubing which has been brazed to some part of the chamber to form an external continuation of an opening into the chamber. When the desired level of gas pressure within the chamber has been met, the tube is "pinched off" and often soldering employed at the end of this pinched-off portion of the tube to accomplish completeness of the sealing. This type of "pigtail" sealing presents a number of disadvantages: (a) reliability of the seal is poor (b) the seal itself presents an undesirable appendage extending from the chamber proper (c) the "pigtail" is usually too short to enable repair thereof and refilling of the chamber (d) the seal is particularly untrustworthy where high pressures are employed within the chamber.

The present invention provides for the filling and sealing of pressure chambers, such as ion chambers and the like, which are filled through a hole thereinto. It involves sealing the pressure chamber by inserting into its hole, leading to the outside, a removable plug which is adhesively bonded to the pressure vessel and which effectuates a highly effective multiple-sealing action: one type seal is effectuated by the adhesive bond established between the plug and wall(s) of the chamber hole in which it fits; the other type seal is an O-ring seal also located between the plug and the surface of the mating chamber hole and somewhat longitudinally separated from the location of the adhesive seal. Looking from inside the chamber outwardly, the adhesive seal is first encountered and then the O-ring seal is encountered as a backstop thereto. The double sealing action just described is sometimes reinforced by additional adhesive-bond and/or O-ring seals located outwardly (from the pressure vessel interior) of the above-described seals. Generally, the hole of the pressure vessel is closed by thrusting a plug circumferentially rimmed with adhesive into the complementarily-shaped chamber hole where it seats and is held in place by forced fit or other means until the adhesive sets and cures, at which time the plug proper is securely bonded in place to the chamber by a continuous, closed strip of the adhesive which acts, not only as a bond between the plug and the chamber, but as a gas seal therebetween, as well. The fit between the plug and the surface(s) of the pressure vessel hole may be an interference fit, i.e., oversized plug forced into the hole. In addition, where extremely high internal pressures are utilized within the pressure chamber, the plug may be threaded in part and screwed into position, mating with complementary threads of the pressure chamber hole. Because of the presence of the intervening adhesive seal between it and the inside of the chamber, the O-ring is isolated from continuous contact with the gas contained in the chamber, with the twofold result that the O-ring (generally rubber) is protected from deteriorating reaction with the chamber gas to protect both the O-ring from deterioration by the gas and the gas from contamination by the O-ring. The effects of these two seals is additive to produce a so-called multiple-seal. The sealing plug used herein may be removed and replaced, as desired, to enable chamber refilling and resealing which is simplified, reliable and inexpensive. The plug type seal employed here is particularly advantageous in ensuring effective sealing of high pressures (e.g., 15,000 p.s.i.) in these pressure chambers and, in effect, makes possible high pressure chambers which are inexpensive. The multiple-sealing method and apparatus used herein also renders possible very rapid closing of the pressure vessel.

A significant feature of the present invention is that the sealing plug can be inserted into operative sealing position in the pressure vessel without suffering loss of gas from the interior of the vessel being sealed.

Another significant feature of the present invention is that it effectuates a no-gas-pressure differential across the uncured adhesive, which is to bond the sealing plug to the vessel proper, allowing the adhesive to cure "in place" without impairment of its integrity.

An object of the present invention is to provide a gastight pressure vessel which can be quickly and effectively sealed.

Another object is to provide a gastight pressure vessel wherein the seal can be quickly removed.

Still another object is to provide a gastight pressure vessel wherein the seal can be quickly removed and quickly replaced.

An additional object is to provide a gastight pressure vessel whose seal can withstand high internal pressures within the vessel.

A further object is to provide a gastight pressure vessel having a highly reliable seal.

Still another object is to provide a gastight pressure vessel whose seal can be replaced without loss of gas pressure from within the vessel.

Other objects and many of the attendant advantages of the invention will be readily appreciated as the same becomes better understood by reference to the following detailed description when considered in conjunction with the accompanying drawing in which like reference numerals designate like parts throughout the various figures thereof and wherein:

FIG. 1 is an elevational view, partly in section, showing the equipment for holding the pressure chamber in position and for inserting its sealing plug therein in conformity with the method of sealing employed herein;

FIG. 2 shows one type of sealing plug and that portion of a pressure chamber base with which it is meant to mate;

FIG. 3 shows another type of sealing plug and its complementary chamber base section; and FIG. 4 shows a third type of sealing plug and complementary chamber base section, especially adapted for high pressures in the pressure chamber.

Referring now to the drawing wherein like reference numerals designate like or corresponding parts throughout the several views, FIG. 1 shows the equipment for holding a bottom-pierced pressure vessel 11 and inserting into its bottom opening 12 a sealing plug 13. Supporting member 14 has a series of circumferentially spaced tapped bores 16 adapted to receive a plurality of bolts 17 which function to fasten to supporting member 14 adapter 18 which is selected to conform to the shape of the vertically extending walls of pressure vessel 11. Adapter 18 has a pair of annular recesses 19 and 21 therein, the inner, upper recess 19 containing an O-ring 22 and the outer, lower recess 21 containing an O-ring 23. O-ring 22 operates to form a gas seal between adapter 18 and pressure vessel 11 and O-ring 23 forms such a seal between adapter 18 and the upper portion of supporting member 14.

Constrained from horizontal movement by snugly surrounding adapter 18, pressure vessel 11 rests within supporting member 14 with its base 24 supported by a spacer 26 which, in turn, rests upon the supporting member 14.

A substantially Z-shaped clamp 15, having its lower horizontally-extending leg 25 fixedly secured to adapter 18 by means of one of the bolts 17, has its upper horizontally-extending leg 20 in abutting contact with the uppermost portion of pressure vessel 11. This clamp 15, whose upper leg 20 may be shaped to conformingly mate with the upper portion of vessel 11, has some degree of resilience, but is sufficiently strong to hold vessel 11 in place on spacer 26 in opposition to any upward thrust on vessel 11 due to gas pressure from below.

Supporting member 14 is provided with an externally-extending conduit 27 which connects with an opening 28 through spacer 26 to allow free flow of gas between an external tubing 29, which is led into the conduit 27 in supporting member 14 and is joined to supporting member 14 in a gas-tight union, and the interior of pressure vessel 11 by a route traced respectively through conduit 27, spacer opening 28, space 43 and the opening 12 in base 24 of pressure vessel 11.

Supporting member 14 is centrally bored to admit a push rod 31 whose shaft 32 is shaped for a close, but sliding, fit with the passageway therefor bored in supporting member 14. Shaft 32 of push rod 31 is radially enlarged at its upper end to form an annular flange section 33 which can come to abutting rest on supporting member 14, and which provides a supporting seat at its upper end for holding the sealing plug 13 which is to be inserted into the opening 12 in base 24 of pressure vessel 11. Shaft 32 is positioned in the bore of supporting member 14 so that it and the sealing plug 13 supported by push rod 31 are coaxially aligned with the opening 12 in supporting member base 24.

Descending from the plug-seating portion of push rod 31 is a hexagonal cross section well 36 adapted to hold an Allen wrench for enabling the screwing into place in the opening 12 of base 24 of a screw-type plug later to be described.

The shaft 32 of push rod 31 is recessed at a lower portion, still within the confines of supporting member 14 during operative vertical movement of push rod 31, to receive an O-ring 37 which, like the precedingly-described O-rings, functions to form a gas seal—here between the bore in supporting member 14 and the push rod shaft 32.

Below the location of O-ring 37 shaft 32 is provided with an operator-removable spring clip 38, of conventional design. This spring clip 38 is yieldable to operator-applied pressure on push rod 32, but functions to prevent push rod 32 from being sucked into space 43 when this space 43 is under vacuum.

FIG. 1 shows sealing plug 13 and the opening 12 in the base 24 of pressure vessel 11 in general detail. In a description of the method which follows FIG. 2 should be referred to, as well as FIG. 1, especially in order to understand how the adhesive seal is furnished.

The primary requirements of a suitable adhesive 39 for forming the adhesive seal between the walls defining bottom opening 12 in base 24 of pressure vessel 11 and sealing plug 13 are that it be capable of forming a strong bond between a variety of different types of materials and that the adhesive be relatively chemically inert. One hundred percent epoxy premixed with a hardener has been found to be quite satisfactory for the job and in the actual embodiments produced here Biggs R–313 adhesive was used.

The fluid epoxy adhesive is spread along the periphery of the top portion of pressure vessel base opening 12 as shown at 41 in FIG. 2, and on the sealing plug 13 in the area of the chamfer as shown at 42 (FIG. 2). The interior of pressure vessel 11 and the gas conducting portions intermediate the interior of pressure vessel 11 and tubing 29 (as defined by opening 12, space 43 within spacer 26, opening 28 in spacer 26, and supporting member conduit 27, respectively) are pumped down, purged and then filled with the selected gas to the pressure desired for the interior of pressure vessel 11 by means of appropriate conventional pumping and gas supplying equipment connected to the outboard end of tubing 29. When the desired gas pressure is achieved sealing plug 13 is thrust into the base opening 12 by operator-controlled upward movement of push-rod 31 and is seated therein. This plug 13 must be held in this heated position until the epoxy adhesive 39 sets and cures to bond together the plug and the pressure vessel base.

The holding of plug 13 in seated position in the base of pressure vessel 11 can be accomplished in several ways. The plug 13 can be held in place by operator-applied pressure on push rod 32 until the adhesive sets and cures. Or, as sealing plug 13, a plastic plug, of filled Teflon, or the like, somewhat oversized with respect to the opening 12 into which it is thrust, may be employed to yield a "forced or interference fit" which will serve to hold the plug in seated position until the adhesive sets and cures to effectuate its bonding action. FIG. 2 portrays such an "oversized" plastic plug. In both of the instances just mentioned adhesive 39 is spread on plug 13 in a continuous annular ring as shown at 42 in FIG. 2. Another method for holding the sealing plug in its seated position until the epoxy adhesive 39 sets and cures is to utilize a pressure-sensitive adhesive for holding the plug in this seated position. FIG. 3 illustrates the use of such an adhesive located in an annular ring as seen at 49. This pressure-sensitive adhesive (Eastman 910 was employed here) cures immediately under pressure to bond together the base of vessel 11 and the plug 46 sufficiently to hold plug 46 in its seated position until the epoxy adhesive continues to ring at 48 can cure and set. It will be noted in FIG. 3 that epoxy adhesive 39 is also placed in an annular ring around the top portion of opening 47 in a position at 50 where it will be coincident with the adhesive located at 48 on plug 46 when the plug is in seated position in the vessel base opening. In like fashion and for the same reason epoxy adhesive 39 is deposited as shown at 41 in FIG. 2. Referring to FIG. 3 plug 46, epoxy adhesive 39 may be employed at 49 but this will require that plug 46 be mechanically held in its seated position in the vessel base opening until the adhesive strips at 48 and 49 set and cure.

As previously described, while plug 13, or any of the other plug embodiments shown, are being thrust into seated position in the vessel base opening, the gas conducting portions within supporting member 14 (i.e., conduit 27, opening 28, space 43) are filled with the same gas at the same gaseous pressure as is vessel 11, including its base opening. These gas-conducting portions within supporting member 14, in effect, enable establishment of a body of the gas selected as the type for the vessel contents, externally adjacent to the pressure vessel 11 and equal in pressure to the gas within the vessel 11. The seating operation of the sealing plug, accordingly, takes place wholly within this isobaric gaseous environment, with the result that the O-rings located around the shanks of the various plugs as seen at 44, 51 and 56 in FIGS. 2–4, incl., become operative, when the various sealing plugs are inserted into seated position in the vessel base opening, to form a gas precluding seal between the plug shank and the surface defining the vessel base opening. Tubing 29 and the conduit portions within supporting member 14 can be vented immediately after seating insertion of the sealing plug into the vessel base opening (and assuming that one of the various methods described above is employed to hold the plug in this seated position, in opposition to the pressure from within the vessel 11 which will tend to force the plug out, until the epoxy adhesive 39 has had time to set and cure) the particular substantially medially located O-ring (be it 44, 51 or 56) will effectuate a no gas pressure differential across the uncured adhesive mixture (of the epoxy premixed with a hardener). It is this no gas pressure differential thus created that enables the epoxy adhesive 39 to cure in place. If there would be a gas pressure differential across the adhesive bands 42, 48, 54 for example, this pressure differential would tend to blow the uncured adhesive out of place and would be destructive of the bonding and sealing action effectuated by the "in place" curing of the adhesive.

The presence of the above-described "external" body of gas is equally important for the fact that it enables seated insertion of the sealing plug into the vessel base opening without loss of any of the gaseous contents of the vessel 11.

As noted above, tubing 29 and its associated conduit portions within supporting member 14 may be vented immediately after seating of the sealing plug in the vessel base opening because the O-ring (44 or 51 or 56) establishes the required no gas pressure differential. However, in the rare instances where an "ultra-effective" sealing effect is required venting of tubing 29 and these conduit portions may be postponed until epoxy adhesive 39 has had time to set and cure.

The plug 46 portrayed in FIG. 3 is generally metal and is adapted to withstand a higher gas pressure in the pressure vessel 11 than is the "interference fit" plastic plug illustrated by FIG. 2.

During the purging, filling and sealing processes the O-rings 22, 23, and 37 have acted in concert to keep the combined gas conducting portions within supporting member 14 and the interior of pressure vessel 11 sealed off from the outside so that these gas bearing areas can be controlled via tubing 29, making possible insertion of the plug without loss of gas from the vessel 11.

FIG. 4 shows still another type plug utilized in this invention. It will be noted that both the pressure vessel base opening 52 and the plug 53 are threaded in part and that plug 53 and its complementary pressure vessel base opening 52 are shown in operative engagement. Adhesive 39 is deposited along the top portion of opening 52 so as to be located, when the plug 53 is seated in the opening 52, between the plug 53 and the surface defining the top portion of opening 52, as seen at 54, and the resulting sealing effect is added to by the O-rings 56 and 57, the former being located medially around the plug 53 and latter being circumferentially spaced from the shank 58 of plug 53 so that it is trapped between the horizontally-extending bottom-most portion of pressure vessel base 59 and the enlarged head portion 61 of the plug. Retainer ring 62 positioned outwardly of O-ring 57 both limits its outward radial movement and limits the degree of compression that this O-ring 57 can be placed under as plug 53 is screwed into the base 59; otherwise excessive compression of O-ring 57 might leave it permanently deformed to destroy its necessary resilience. Head portion 61 of plug 53 has a socket 63 formed therein which mates with the previously mentioned Allen wrench which will seat in the well 36 of push rod 31 so as to allow screwing of plug 53 into base 59 by rotary movement of the push rod shaft 32 by the operator. This particular threaded-plug 53 and its threaded-in-part complementary pressure vessel opening 52 are employed when extremely high gas pressures are to be utilized within the pressure vessel 11. Here, as related to the prior-described sealing plugs, the same "external" body of gas is operative to prevent escape of gas from vessel 11 while the plug is being seatedly inserted in the vessel base opening and to enable establishment by O-ring 56 of a no gas pressure differential across the uncured epoxy adhesive to allow it to cure and set "in place."

All of the plugs mentioned are readily removable by mechanical prying sufficient to burst the adhesive bond as relates to the plugs of FIGS. 2 and 3 and by unscrewing as relates to the plug of FIG. 4. It can also be readily seen that the plug type seal used herein lends itself to being "unbonded" from the vessel base by the application of sufficient heat to the vessel base in the area surrounding the inserted plug. Replacement plugs are readily available and cheap, thus enabling refilling and resealing of the pressure vessel 11 as desired. In most instances after a plug has been extracted it may probably be used again as the replacement plug; in some instances it may be more feasible to use a new plug as the replacement plug. The plugs are relatively cheap, so even the use of a new plug poses no financial cost of consequence.

In all of the embodiments of the sealing plug an adhesive seal isolates the O-ring(s) (normally made of rubber) from long-term reaction with the gas in the pressure vessel, with consequent protection of the gas from decontamination by the O-ring(s) and protection of the O-ring(s) from deterioration by the gas in the vessel.

All of the plugs utilized (as seen in FIGS. 2 to 4) demonstrate multiple sealing actions: the plug 13 of FIG. 2 has a combined sealing effect due to the joint action of adhesive 39, as seen at 41, 42, O-ring 44 and the "forced or interference" fit of the plug itself with the vessel base opening; the plug 46 of FIG. 3 has two separate adhesive sealing actions, one at the top and one at the lower portion of the plug and the sealing action of the O-ring 51 intermediate these two adhesive seals; and the plug 53 of FIG. 4 has the combined sealing action of the adhesive seal at the top of the plug and the respective sealing actions of O-rings 56 and 57, this accumulative sealing action being added to somewhat by the union of the complementary threaded sections on the plug 53 and the threaded surfaces defining the top portion of the base opening 52.

Bonding action which acts to maintain the plugs in seated position in the vessel opening is concomitant with the adhesive sealing actions described in the paragraph above for the various plug embodiments shown. This adhesive bonding action is supplemented in the plug of FIG. 2 where an "interference fit" is employed and in the plug of FIG. 4 by the, no doubt, stronger securing action of the threaded union between plug and vessel.

In some applications it may be possible to use a sealing plug not equipped with an O-ring about its shank. This would probably call for the use of an oversized plastic plug for an "interference fit" and, in any event, would necessitate maintenance of the previously-described "external" body of gas in space 43, etc., until adhesive 39 has had time to set and cure, for absent the O-ring the continued presence of this "external" body of gas would be necessary to permit "in place" setting and curing of the adhesive 39 which is essential to the establishment of a proper bond-and-seal by this adhesive when cured.

Obviously many modifications and variations of the present invention are possible in the light of the above teachings and it is intended to cover all changes and modifications hereto which do not constitute departures from the spirt and scope of the invention.

What is claimed is:
1. A gastight pressure vessel comprising:
(a) an envelope adapted to contain gaseous contents whose pressure significantly exceeds that of atmospheric pressure, said envelope being formed with an externally-leading conduit therein; and
(b) quickly-operator-removable and quickly-operator- replaceable sealing means insertedly positioned in said conduit for rendering said vessel gastight;
(c) said sealing means comprising:
(1) a plug having a head and a shank, the shank of said plug being complementarily shaped to insertedly mate with said conduit in a fit flush with the inner wall of said envelope and said shank being further formed with a peripherally-disposed recess therein which is adapted to contain an O-ring, said plug being adapted to be inserted in and to be extracted from said conduit by a substantially solely rectilinear movement of said plug;
(2) an O-ring positioned in the peripheral recess of said shank for forming a gas-precluding seal between the shank of said plug and the walls defining said conduit;
(3) a continuous band of set and cured bonding-and-sealing adhesive disposed peripherally around the plug shank, said band of adhesive being located intermediate said O-ring and the inner portion of said envelope and having its radially-inner boundary in unbroken contact with the plug shank and its radially-outer boundary in unbroken contact with the walls of said envelope conduit, said band of adhesive serving both to bond the plug shank to the walls of said conduit and to form a gastight seal between said plug and the walls of said conduit;
(4) the bonding action by said bonding-and-sealing adhesive serving to hold said plug in inserted, sealing position in the conduit of said vessel and yet allowing said plug to be easily and quickly extractable by operator-applied extracting force on said plug and the sealing action by said adhesive protecting said O-ring from any deterioration by gaseous contents of said envelope and gaseous contents of said envelope from any contamination by said O-ring.

2. A sealing member, adapted to seal the externally-leading conduit of a pressure vessel which is to be rendered gastight and which is to contain gaseous contents whose pressure significantly exceeds that of atmospheric pressure, comprising:
(a) a plug having a head and a shank, the shank of said plug being complementarily shaped to insertedly mate with the conduit of said pressure vessel in a fit flush with the inner wall of said pressure vessel and the shank of said plug being further formed with a peripherally-disposed recess therein which is adapted to contain an O-ring;
(b) an O-ring positioned in the peripherally-disposed recess formed in the shank of said plug and adapted to form a gas-precluding seal between the shank of said plug and the walls defining the conduit of said vessel when the shank of said plug is insertedly mated with said conduit; and
(c) a continuous band of bonding-and-sealing adhesive disposed peripherally around the plug shank at its end remote from the plug head, the location of said band of adhesive on the plug shank being such that said O-ring lies intermediate said band of adhesive and the head of said plug, whereby, when the shank of said plug is insertedly mated with the conduit of said vessel, said O-ring will ensure an absence of gas-pressure-differential across said band of adhesive thereby allowing it to set and cure in place without impairment of its integrity.

References Cited in the file of this patent

UNITED STATES PATENTS

| | | |
|---|---|---|
| 572,365 | McCorkindale | Dec. 1, 1896 |
| 1,478,918 | Rupp | Dec. 25, 1923 |
| 2,436,407 | Stephens | Feb. 24, 1948 |
| 2,476,074 | Unger | July 12, 1949 |
| 2,752,814 | Iaia | July 3, 1956 |
| 2,775,917 | Ferguson | Jan. 1, 1957 |

FOREIGN PATENTS

| | | |
|---|---|---|
| 74,315 | Switzerland | July 2, 1917 |
| 1,029,622 | Germany | May 8, 1958 |